UNITED STATES PATENT OFFICE.

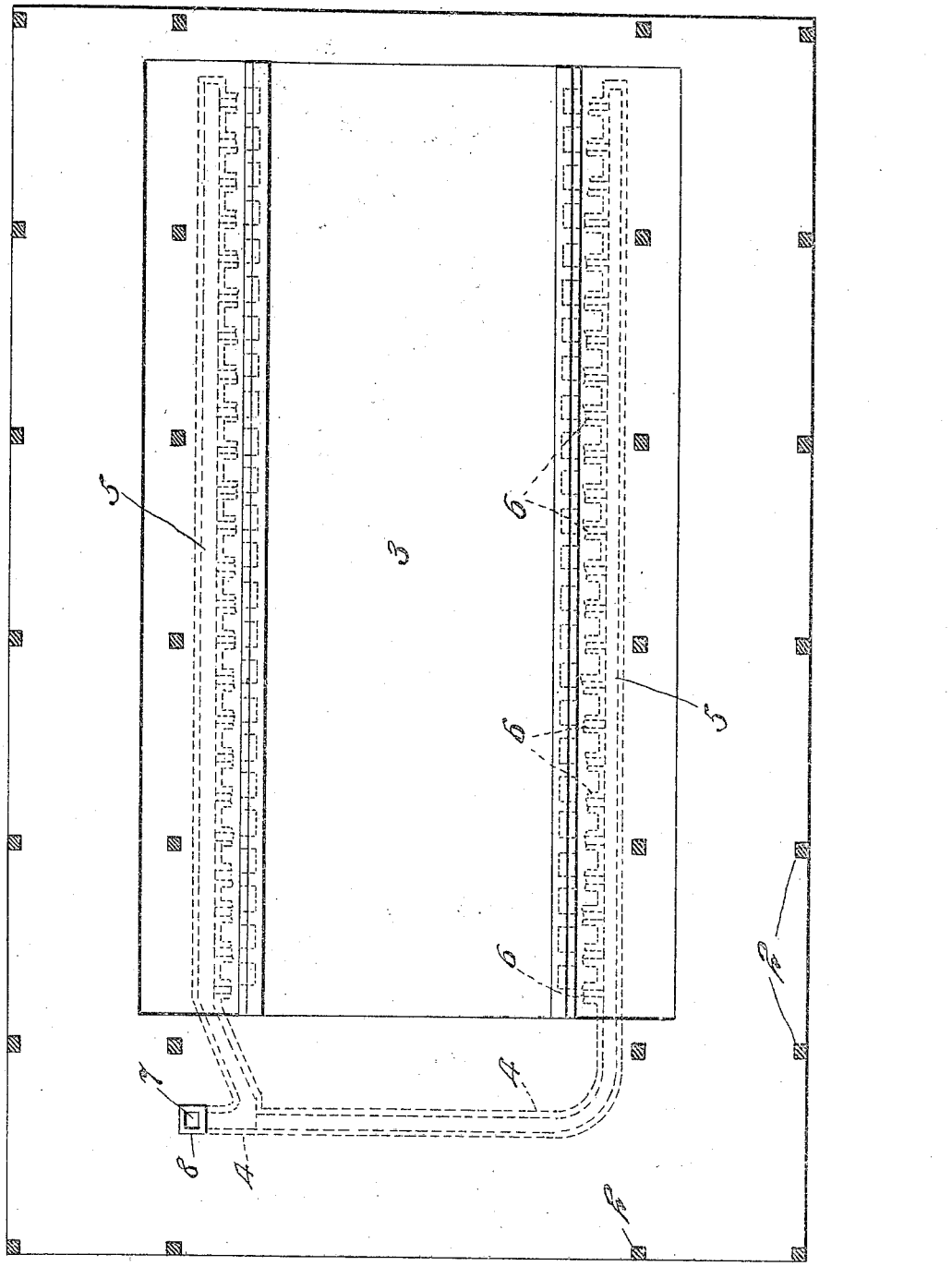

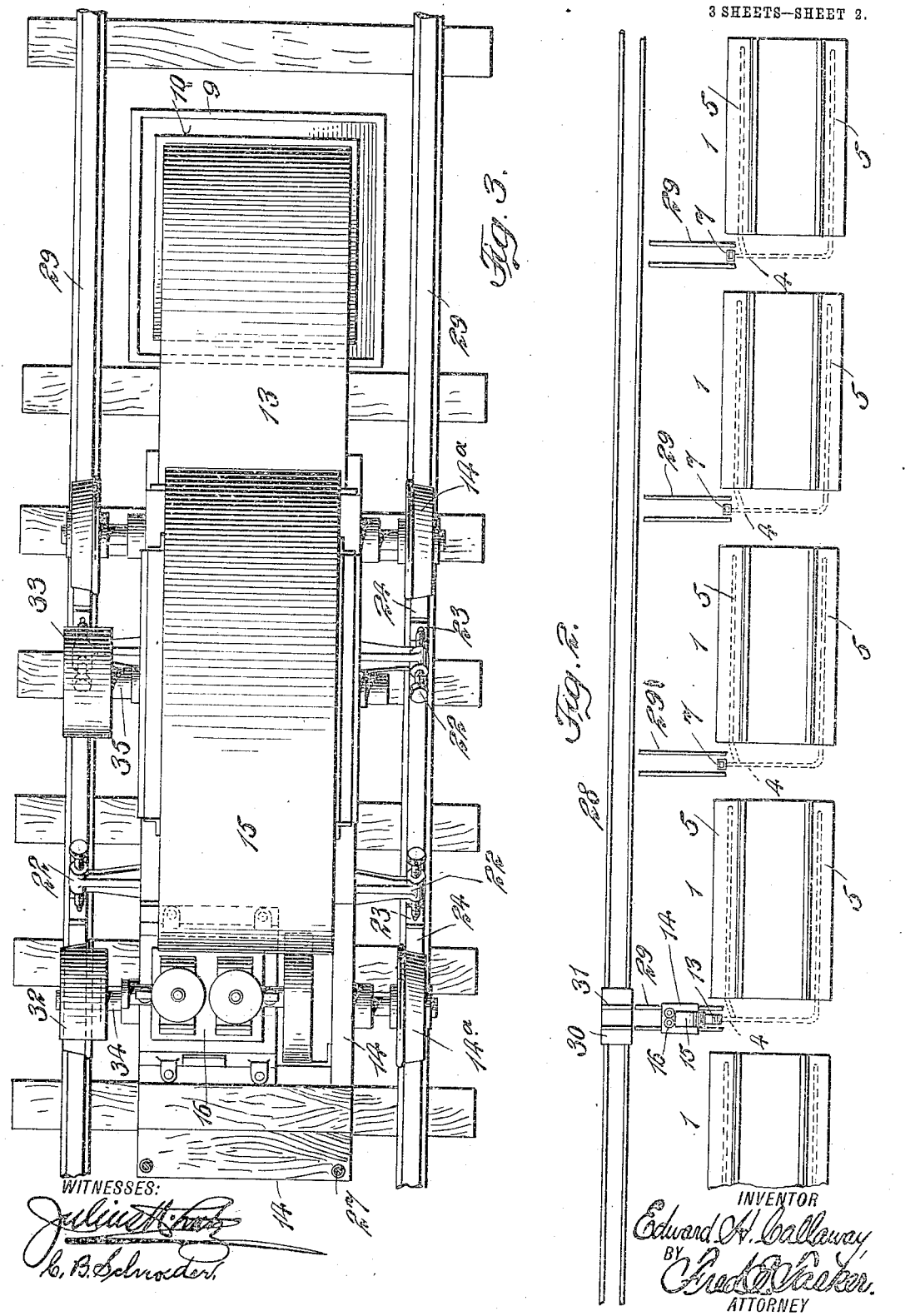

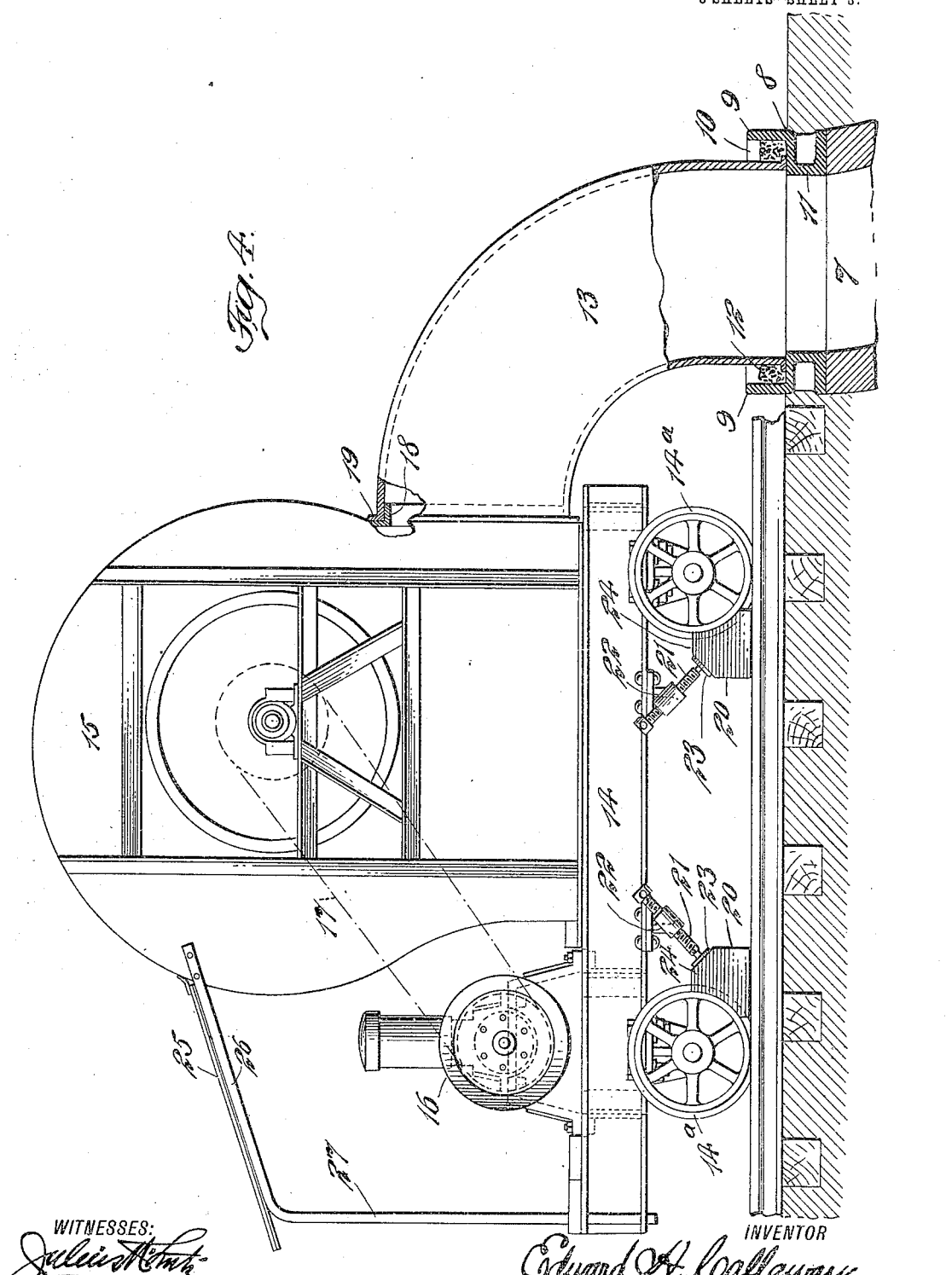

EDWARD H. CALLAWAY, OF WESTFIELD, NEW JERSEY, ASSIGNOR TO THE AMERICAN CLAY MACHINERY COMPANY, OF BUCYRUS, OHIO, AND NEW YORK, N. Y., A CORPORATION OF OHIO.

PORTABLE BLOWER FOR BRICK-KILNS.

958,223. Specification of Letters Patent. Patented May 17, 1910.

Application filed June 24, 1908. Serial No. 440,115.

*To all whom it may concern:*

Be it known that I, EDWARD H. CALLAWAY, a citizen of the United States of America, residing at Westfield, in the county of Union and State of New Jersey, have invented certain new and useful Improvements in Portable Blowers for Brick-Kilns, of which the following is a specification, reference being had therein to the accompanying drawing.

My invention relates to means for creating an artificial draft for the furnaces of brick-kilns, my object being to provide greatly improved and simplified devices whereby a brick manufacturing plant, containing a series of brick-kilns, can be equipped with means for more simply and economically supplying a forced draft to each kiln without the necessity of establishing and maintaining a central plant with an essentially large and expensive engine and blower, and a large, costly main duct leading therefrom to the several kilns.

To this end my invention consists in the peculiar features and combinations of parts more fully described hereinafter and pointed out in the claims.

In the accompanying drawings, Figure 1 represents a plan view of an individual kiln to which my device is applicable. Fig. 2, a diagrammatic view of a series of kilns having a line of railroad extending past all of them, from which branches or spurs lead to each kiln, a blower being shown in action at one of the kilns. Fig. 3 is a top view of the blower as when connected with the underground air duct of one of the kilns, and Fig. 4, a side elevation of the connected blower, parts being shown cut away to better show the construction.

Each kiln 1 is housed under in a shed which it is not deemed necessary to show. The numerals 2 indicate sectional views of the vertical posts adapted to support such a structure, and 3 the floor of the shed. Forced draft is supplied to the kiln through an underground air duct 4 having branching arms 5 extending along the outer sides of the kiln. Short lateral ducts 6 subdivide and distribute the air equally to the furnaces within the kiln.

7 represents an exteriorly inlet which curves downwardly to and forms a part of the underground duct 4. The mouth of this inlet lies substantially flush or level with the floor around the outside of the kiln, and is provided with a square pipe connection 8 set on the end of the duct 4. A vertical flange 9 extends around and projects upwardly from the outer edge of the connection 8, and a horizontal shoulder 10 is left between it and the inner wall 11. This shoulder is adapted to receive the flanged end of a short portable and removable elbow 13 supplied with a packing 12. This elbow 13 connects a portable driven blower 15 with the duct. The blower is mounted on one end of a railroad carriage 14, which carries an engine 16 on the other end, and is connected to drive the blower by a belt 17. The carriage 14 has flanged car wheels 14$^a$. The outlet of the blower is provided with a flanged member 18 which receives over it the upper flanged end 19 of the elbow 13. To keep the carriage and hence the blower perfectly stationary and steady when connected with a kiln duct, and when the engine is in action, the carriage wheels are blocked both ways by two oppositely facing chock-blocks 20, each of which is concaved on one side to receive the tread of a wheel, and flattened upon the bottom to lie on the top of the rail. Diagonal jack-screws 21 on laterally extending brackets 22 fixed on the carriage 14 hold the blocks tight against the wheels, and block them against movement in either direction. Each jack-screw is provided with a foot 23 which bears on an inclined face 24 on the back of the block 20. The longitudinal axis of each screw is substantially tangent to the periphery or tread of the wheel to which it is applied, in order to more perfectly resist the movement of the wheels while the engine is working.

25 represents an inclined hinged cover over the engine, resting upon the sloping arms 26 of stanchions 27. Pulleys 32 and 33 are fixed on the extended ends of the engine and blower shafts 34 and 35, respectively, and may be used whenever the exigencies of the occasion require it. In Fig. 2 it will be seen that the kilns are oblong, and are arranged in tandem alinement in relation to one another, and that a railroad 28 parallels them. Short spur-tracks 29 extend at right-angles from the railroad to each inlet 7 of each kiln, whereby the portable power-driven blower can be wheeled upon a transfer truck 30, provided with transverse deck-rails 31 adapted to receive the wheels of the blower carriage 14. The truck may then be rolled over the railroad 28 to a point opposite any spur-track 29 of the particular kiln to be supplied with a forced draft, and then wheeled off the truck onto the spur-track and placed in connection with the inlet 7 of the underground air duct 4. It will be observed that the inlet lies between the rails of the outer end of the spur-track 29. It is given that location to facilitate the coupling of the elbow with the blower and the inlet connection 8. By using a transfer truck 30, the expense of installing frogs and switch connections for each kiln is avoided.

From the foregoing description of the apparatus, it will be apparent that my portable blower can be kept on hand in readiness to be used on any one of the several kilns in the brick yard, and will be most efficient for quickly kindling or accelerating fires. When run on the transfer truck 30, the carriage carrying the blower outfit will lie cross-wise of the truck with the blower end facing the side of the row of kilns. The truck may then be wheeled along by hand until it comes opposite the spur-track of the particular kiln to be acted upon. It is then run on the spur so that the discharge side of the blower will come in proximity to the inlet 7. The movable elbow 13 should now be coupled to the blower and inlet, after which the engine can be started, and a forced draft sent downward through the inlet and duct to the opposite sides of the kiln through the branch ducts where it is distributed to the several furnaces by the laterals. After the fires of this kiln under treatment have been sufficiently accelerated, the movable elbow 13 may be disconnected, the blower outfit pushed back onto the transfer truck 30, and wheeled along over the main track to any one of the other kilns, and the blowing operation repeated.

The various details of my device might be changed in many ways that would suggest themselves to those skilled in the art, therefore I do not limit myself to the precise construction and arrangement herein shown and described, but consider myself entitled to all such changes, believing as I do that they come within the scope and spirit of my invention.

Having thus described my invention, what I claim as new and desire to secure by Letters Patent, is:

The hereindescribed system of providing a forced draft for brick-kilns, which system consists of the combination with a series of brick-kilns provided with air-receiving ducts, a main railroad track extending alongside of said series, a series of lateral spur-tracks connecting the main track with the receiving end of each duct, a railroad flat-car or flat-topped truck provided with car wheels adapted to travel on said main-track, a pair of transverse tracks on top of said track and adapted to register with each of said spur tracks, a portable blower device carrying its own power plant mounted on wheels and adapted to roll on and off said spur-tracks and truck-tracks, and a detachable pipe adapted to form a connection between the blower and the receiving or inlet end of said air duct.

In testimony whereof I affix my signature in presence of two witnesses.

EDWARD H. CALLAWAY.

Witnesses:
RHESA G. DU BOIS,
C. B. SCHROEDER.